United States Patent
Okamoto (10) Patent No.: US 7,757,581 B2
(45) Date of Patent: Jul. 20, 2010

(54) BICYCLE GEAR SHIFTER

(75) Inventor: Tatsushi Okamoto, Osaka (JP)

(73) Assignee: Shimano Inc., Osaka (JP)

( * ) Notice: Subject to any disclaimer, the term of this patent is extended or adjusted under 35 U.S.C. 154(b) by 513 days.

(21) Appl. No.: 11/782,126

(22) Filed: Jul. 24, 2007

(65) Prior Publication Data

US 2008/0110288 A1 May 15, 2008

(30) Foreign Application Priority Data

Nov. 10, 2006  (JP) .............................. 2006-305270

(51) Int. Cl.
*F16C 1/22* (2006.01)
(52) U.S. Cl. .................................................... 74/502.6
(58) Field of Classification Search .................. 74/488, 74/489, 500.5, 501.6, 502.2, 502.6
See application file for complete search history.

(56) References Cited

U.S. PATENT DOCUMENTS

| 5,197,927 | A | 3/1993 | Patterson et al. |
| 6,276,227 | B1 | 8/2001 | Ose |
| 6,494,112 | B2 * | 12/2002 | Chen .......................... 74/501.6 |
| 6,595,894 | B2 * | 7/2003 | Hanatani ..................... 475/349 |
| 2002/0000136 | A1 | 1/2002 | Feng et al. |
| 2005/0081672 | A1 | 4/2005 | Chen |

FOREIGN PATENT DOCUMENTS

| DE | 199 15 334 A1 | 10/2000 |
| JP | 2004-034980 | 2/2004 |
| TW | 399534 | 7/2000 |
| TW | 411937 | 11/2000 |
| TW | 517031 | 1/2003 |

* cited by examiner

*Primary Examiner*—Vicky A Johnson
(74) *Attorney, Agent, or Firm*—Global IP Counselors, LLP (57) ABSTRACT

A bicycle gear shifter is provided with a mounting part, a connector guide part, a winding member, an operating member, an inner wire connector and a connecting cable. The mounting part includes a handlebar mounting structure and a wire guiding structure extending from the handlebar mounting structure. The wire guiding structure includes a wire movement space extending to an outer casing stop with the connector guide part disposed therein. The inner wire connector moves inside the wire movement space along the connector guide part. The inner wire connector detachably holds an end of an inner wire of a gear shift cable. The connecting cable is connected to the winding member and the inner wire connector to move the inner wire connector in response to movement of the winding member.

17 Claims, 7 Drawing Sheets

BICYCLE GEAR SHIFTER

CROSS-REFERENCE TO RELATED APPLICATIONS

This application claims priority under 35 U.S.C. §119 to Japanese Patent Application No. 2006-305270, filed Nov. 10, 2006. The entire disclosure of Japanese Patent Application No. 2006-305270 is hereby incorporated herein by reference.

BACKGROUND OF THE INVENTION

1. Field of the Invention

This invention generally relates to a gear shifter. More particularly, the present invention relates to a bicycle gear shifter that is capable of being mounted to a handlebar of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Over the years, the bicycle gear shifters have been extensively redesigned.

Some bicycles are equipped with internal gear changing devices, while other bicycles are equipped with external gear changing devices. One known type of gear shifter for operating either of these types of gear changing devices is a grip-type gear shifter that is mounted on a bicycle handlebar separately from a brake operating device.

A conventional grip-type gear shifter (e.g., Japanese Laid-Open Patent Publication No. 2004-034980) has a handlebar mounting part, an operating part rotatably mounted to the mounting part, a winding member arranged between the handlebar mounting part and the operating part to wind in a gear shift cable, and a positioning mechanism configured to position the winding member. The handlebar mounting part is provided with a clamp section configured to be fastened to the handlebar by tightening a clamp bolt.

The handlebar mounting part is also provided with an outer casing stop configured to hold an outer casing of a Bowden-type gear shift cable. The handlebar mounting part is further provided with an inner wire holding section for holding an inner wire of a Bowden-type gear shift cable. The other end of the inner wire is connected to a gear changing device, such as a derailleur or an internally-geared hub. The inner wire is normally sold with a tip end thereof already attached to the gear shifter. The length of the inner wire is preset to, for example, approximately 2 m.

In the conventional configuration just described, since the length of the inner wire is predetermined, there is the possibility that the inner wire will not reach the gear changing device if the length of the portion of the inner wire that is arranged inside the gear shifter between the outer casing stop and the place where the inner wire is attached to the winding member is too long. Therefore, the length of inner wire that can be arranged inside the gear shifter is limited.

When the mounting direction of the of the gear shift cable is changed in order to avoid interference with a front basket or for some other reason, the contact between the inner wire and the handlebar mounting part at the portion where the movement direction of the inner wire changes causes the friction force opposing movement of the inner wire to increase. Thus, this can result in an increase in the force required to operate the gear shifter. Consequently, the mounting direction of the gear shift cable is also limited.

Since the length of the portion of the inner wire arranged inside the gear shifter and the mounting direction of the gear shift cable are limited, there are constraints on the shape and structure of the gear shifter and the degree of design freedom with respect to the gear shifter is low.

In view of the above, it will be apparent to those skilled in the art from this disclosure that there exists a need for an improved bicycle gear shifter. This invention addresses this need in the art as well as other needs, which will become apparent to those skilled in the art from this disclosure.

SUMMARY OF THE INVENTION

One object of the present invention is to improve a degree of design freedom with respect to gear shifters having gear shift cables connected thereto. A bicycle gear shifter in accordance with a first aspect of the present invention basically comprises a mounting part, a connector guide part, a winding member, an operating member, an inner wire connector and a connecting cable. The mounting part includes a handlebar mounting structure with a handlebar mounting axis and a wire guiding structure extending from the handlebar mounting structure. The wire guiding structure includes a wire movement space extending to an outer casing stop. The connector guide part is disposed inside the wire movement space of the wire guiding structure. The winding member is movably connected to the mounting part. The operating member operatively connected to the winding member to move the winding member relative to the mounting part. The inner wire connector movably arranged inside the wire movement space along the connector guide part. The inner wire connector is configured to detachably hold an end of an inner wire of a gear shift cable. The connecting cable includes a first end connected to the winding member and a second end connected to the inner wire connector such that the inner wire connector moves in response to movement of the winding member.

With this gear shifter, the tip end of the inner wire of the gear shift cable is held by the inner wire holding part of the inner wire connector. The inner wire connector is connected to the second end of the connecting cable, the first end of which is connected to the winding member. The inner wire connector moves along the connector guide part provided inside the wire guiding structure in response to turning movement of the winding member. The inner wire is connected to the winding member through the connecting cable, and the inner wire connector is guided by the connector guide part in such a manner that it can move smoothly. If the connector guide part is configured such that the movement direction of the inner wire connector can be changed, then the movement direction of the cable spanning from the inner wire to the winding member through the connecting cable can be changed easily. Since a connecting cable is provided between the winding member and the inner wire and the inner wire connector that holds the inner wire is guided by the connector guide part, the length of the inner wire is less limited and the mounting direction of the gear shift cable is less limited. As a result, there are fewer constrictions on the shape and structure of the gear shifter and the degree of design freedom of the gear shifter is improved.

A bicycle gear shifter in accordance with a second aspect of the present invention is a bicycle gear shifter in accordance with the first aspect, wherein the connector guide part includes a curved surface with the inner wire connector slideably arranged on the curved surface. With this aspect of the invention, the connector guide part can be used to change the movement direction of the connecting cable because the connector guide part has a curved surface.

A bicycle gear shifter in accordance with a third aspect of the present invention is a bicycle gear shifter in accordance with the first or second aspect, wherein the winding member is rotatably about the handlebar mounting axis as defined by the handlebar mounting structure, and the wire guiding structure has a first section extending from the handlebar mounting structure with a center axis of the first section extends in a direction that intersects with the handlebar and a second section located remotely from the handlebar mounting structure with respect to the first section with a center axis of the second section extending in a direction that is substantially parallel with respect to the handlebar mounting axis. With this aspect of the invention, the gear shift cable is arranged to follow along the handlebar, and thus, does not easily interfere with a front basket or other accessory that is mounted on the front section of the bicycle.

A bicycle gear shifter in accordance with a fourth aspect of the present invention is a bicycle gear shifter in accordance with any one of the first to third aspects, wherein the inner wire connector is fixed to the second end of the connecting cable in a non-reattachable connection. With this aspect of the invention, the inner wire connector is fixed to the second end of the connecting cable by welding, crimping, or other suitable method. As a result, the work associated with connecting the inner wire connector to the connecting cable can be eliminated.

With the present invention, since a connecting cable is provided between the winding member and the inner wire and the inner wire connector that holds the inner wire is guided by the connector guide part, the length of the inner wire is less limited and the mounting direction of the gear shift cable is less limited. As a result, there are fewer constrictions on the shape and structure of the gear shifter and the degree of design freedom of the gear shifter is improved.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
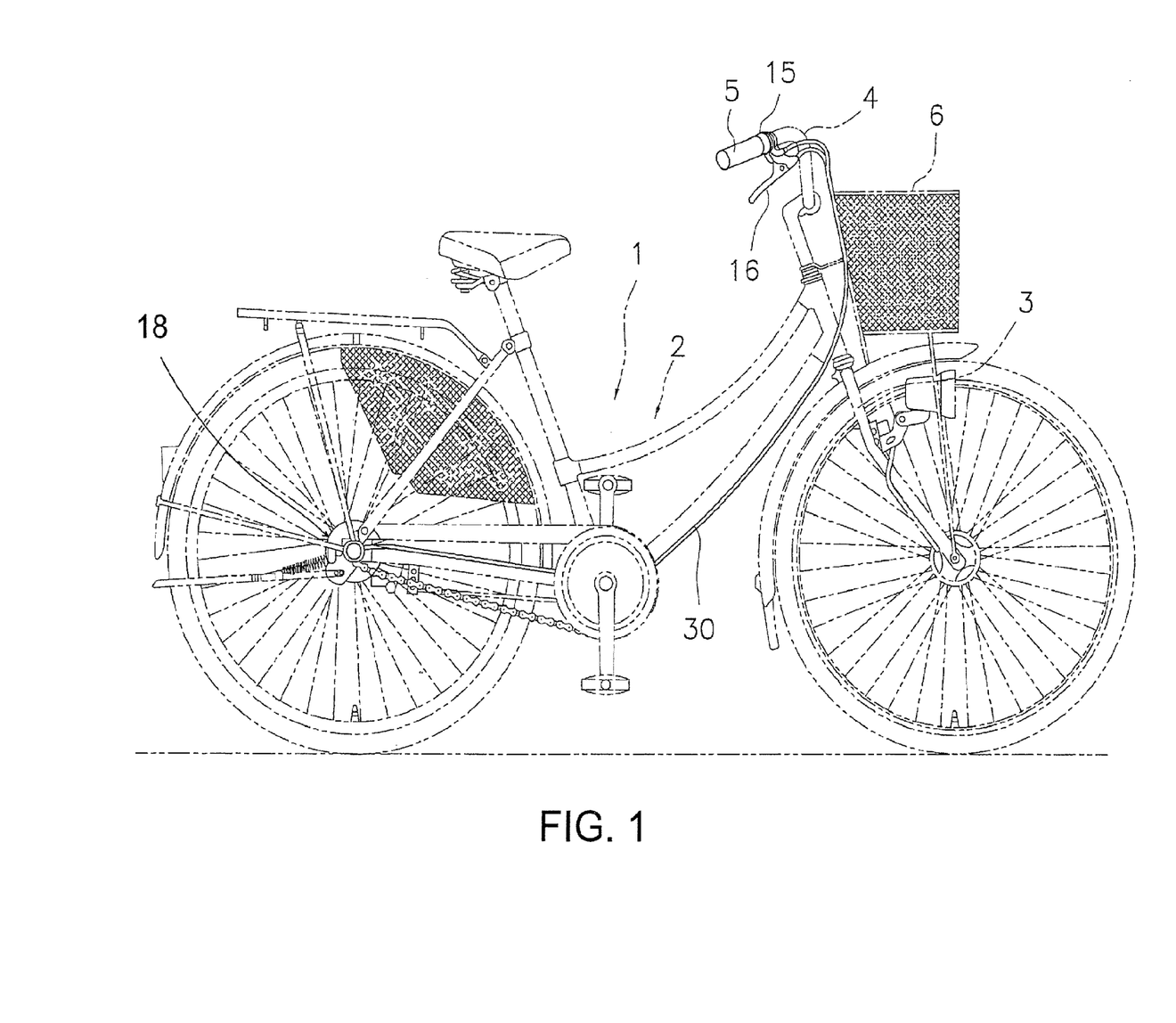
FIG. 1 is a side elevational view of a bicycle equipped with a bicycle gear shifter in accordance with one embodiment of the present invention.

Referring initially to FIG. 1, a bicycle 1 is illustrated in accordance with a first embodiment of the present invention. The bicycle 1 includes a frame 2, a front fork 3, and a handlebar 4. The handlebar 4 is attached to the frame 2 in such a manner as to be fixed to an upper portion of the front fork 3. A front basket 6 is attached to the front of the frame 2. A grip-type gear shifter 15 is mounted to the handlebar 4. A brake operating device 16 is arranged on the handlebar 4 on the inward side of the gear shifter 15. An internally-geared hub 18 is mounted to a rear end portion of the frame 2. The internally-geared hub 18 has a plurality of gears (e.g., three speeds: high, medium, and low). The internally-geared hub 18 constitutes a gear changing device.

Figure 2:
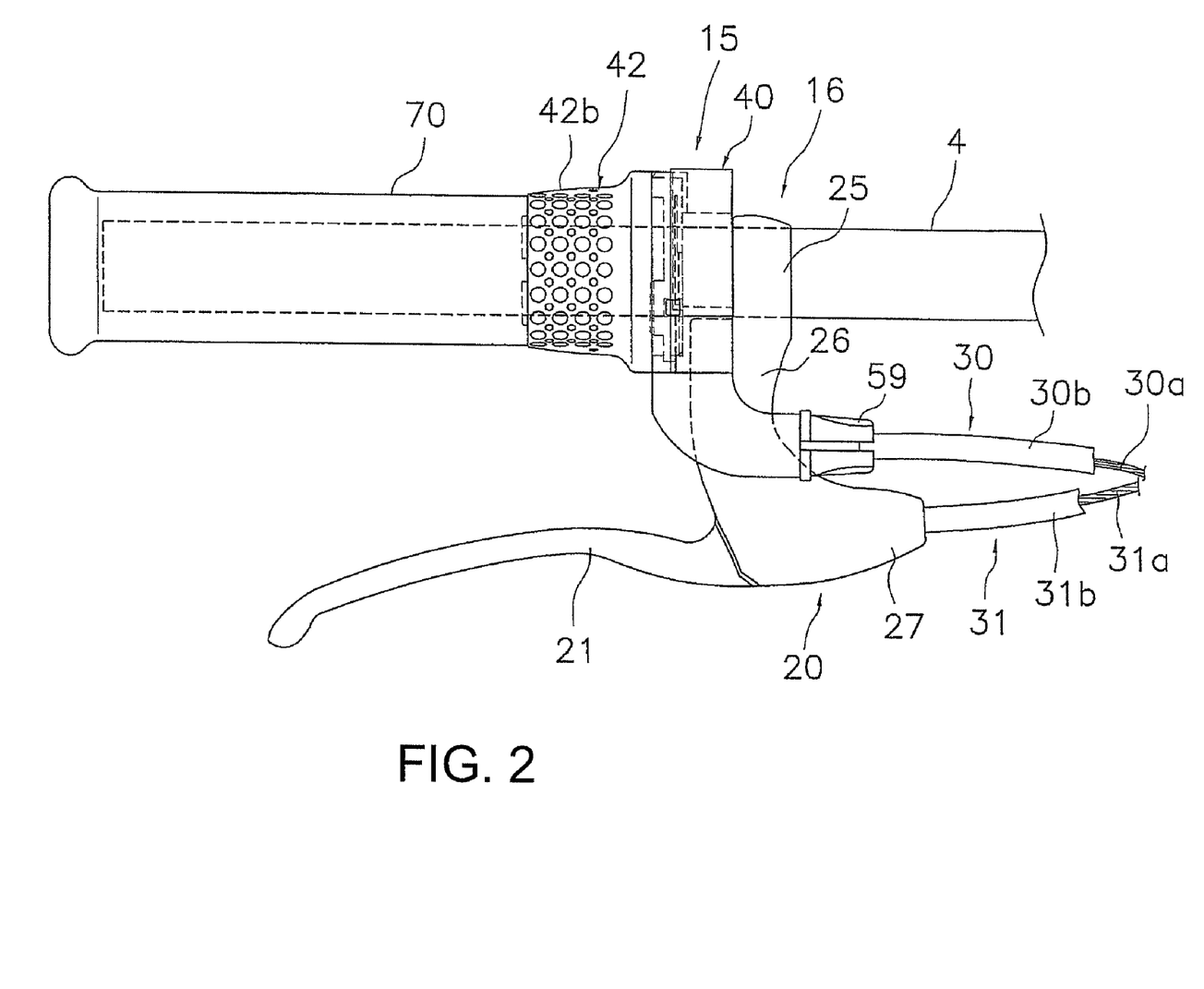
FIG. 2 is a generally front view of a portion of the bicycle handlebar where the gear shifter is mounted.
Figure 3:
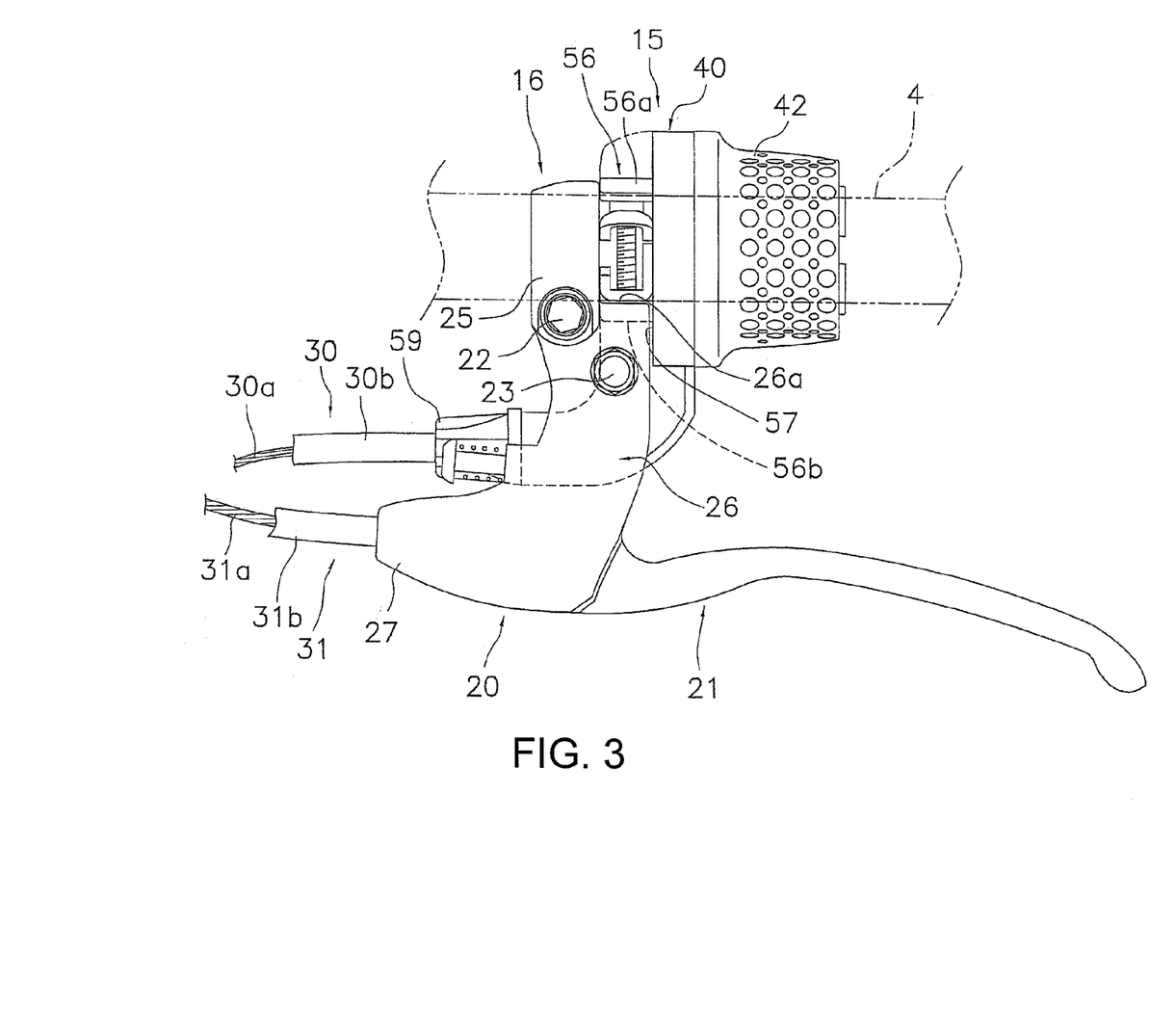
FIG. 3 is an enlarged generally rear view of a portion of the bicycle handlebar where the gear shifter is mounted.

As shown in FIGS. 2 and 3, the brake operating device 16 has a bracket 20 capable of being mounted to the handlebar 4 and a brake lever 21 that is connected to the bracket 20 in such a manner that it can pivot freely. The bracket 20 has a clamp section 25, lever connecting section 26 and an outer casing stop 27. The clamp section 25 is configured to be fastened to the handlebar 4 by being tightened with a clamp bolt 22. The lever connecting section 26 is formed as an integral unit with the clamp section 25 and configured such that the brake lever 21 can be connected thereto such that it can pivot freely about a pivot shaft 23. The outer casing stop 27 extends from the lever connecting section 26 in the opposite direction as the brake lever 21. A step-like section 26a is formed between the clamp section 25 and the lever connecting section 26. The step-like section 26a extends toward the distal end of the brake lever 21 (i.e., the end located farther from the lever connecting section 26). The pivot shaft 23 is arranged in close proximity to the step-like section 26a. Thus, the pivot shaft 23 is arranged closer to the distal end of the brake lever 21 than the clamp section 25. The outer casing stop 27 is configured to hold the outer casing 31b of the Bowden-type brake cable 31.

The brake lever 21 is connected to the pivot shaft 23 at its proximal end (i.e., the end of the brake lever 21 that is closer to the lever connecting section 26). A portion of the brake lever 21 spanning from the proximal end to an intermediate section is enclosed inside the bracket 20 and the inner wire 31a of the brake cable 31 is attached to the intermediate section. The brake lever 21 is configured to bend at the intermediate section thereof such that the portion between the intermediate section and the distal end extends away from the outer casing stop 27 while maintaining a prescribed spacing with respect to the handlebar 4.

A Bowden gear shift cable 30 operatively connects the gear shifter 15 to the internally-geared hub 18. The Bowden gear shift cable 30 includes an inner wire 30a and an outer casing 30b as seen in FIG. 2. Free ends of the inner wire 30a extend out from opposite ends of the outer casing 30b such that one end of the inner wire 30a is connected with the inner wire 30a (FIG. 2) of a Bowden gear shift cable 30 to the gear shifter 15 and the other end of the inner wire 30a is connected the internally-geared hub 18. The inner wire 30a is pulled in the direction of the internally-geared hub 18 by the internally-geared hub 18.

The gear shifter 15 is a twist-grip type gear shifter configured to pull and release the inner wire 30a of the Bowden gear shift cable 30 so as to move the inner wire 30a among a plurality of indexing positions (e.g., three indexing positions, namely a low speed position, a medium speed position, and a high speed position) in accordance with the gears of the internally-geared hub 18.

As shown in FIGS. 4 to 7, the gear shifter 15 basically includes a mounting part 40, a winding member 41, an operating member 42, an connector guide part 43 (FIG. 5), a connecting cable 44, and an inner wire connector 45. The mounting part 40 is configured to be mounted to the handlebar 4. The winding member 41 is rotatably connected to the mounting part 40. The operating member 42 operatively connected to the winding member 41. The connector guide part 43 is provided in the mounting part 40. The connecting cable 44 is connected at a first end to the winding member 41. The inner wire connector 45 is connected to a second end of the connecting cable 44.

The mounting part 40 has a mounting part main body 50, a metal clamp member 51, a wire guiding structure 52 and a turning movement support section 53. The mounting part main body 50 (exemplifying a handlebar mounting structure) is made of a synthetic resin material. The metal clamp member 51 is fixed to the mounting part main body 50. The wire guiding structure 52 is formed integrally with the mounting part main body 50 and configured to extend from the mounting part main body 50. The turning movement support section 53 (FIG. 4) is non-rotatably connected to an internal circumferential section of the mounting part main body 50. The open portion of the mounting part 40 is covered with a cover member 54. The mounting part main body 50 also has a cylindrical connecting section 55, a U-shaped clamp housing section 56 and a housing section 57. The cylindrical connecting section 55 has an internal cylindrical portion into which the turning movement support section 53 is connected. The U-shaped clamp housing section 56 has a smaller diameter than the connecting section 55. The U-shaped clamp housing section 56 is configured for receiving the clamp member 51 to be fixed to the inside thereof. The housing section 57 is configured to be capable of housing at least a portion of the bracket 20.

The clamp housing section 56 has U-shaped first and second sides 56a and 56b that are spaced apart from each other and arranged to face in directions that are substantially perpendicular to the wire guiding structure 52. This arrangement enables the housing section 57 to be formed. A distal end portion of the first side 56a is provided with a through hole 56c that is configured such that a clamp bolt 60 (described later) can pass there-through. A distal end portion of the second side 56b is provided with a through hole 56d that is configured such that a nut part 51b (described later) can be arranged therein.

The housing section 57 is provided in the outward facing surface of the second side 56b of the clamp housing section 56. The housing section 57 comprises a recess that is recessed toward the connecting section 55 and configured such that the step-like section 26a of the bracket 20 of the brake operating device 16 can be housed therein.

Figure 6:
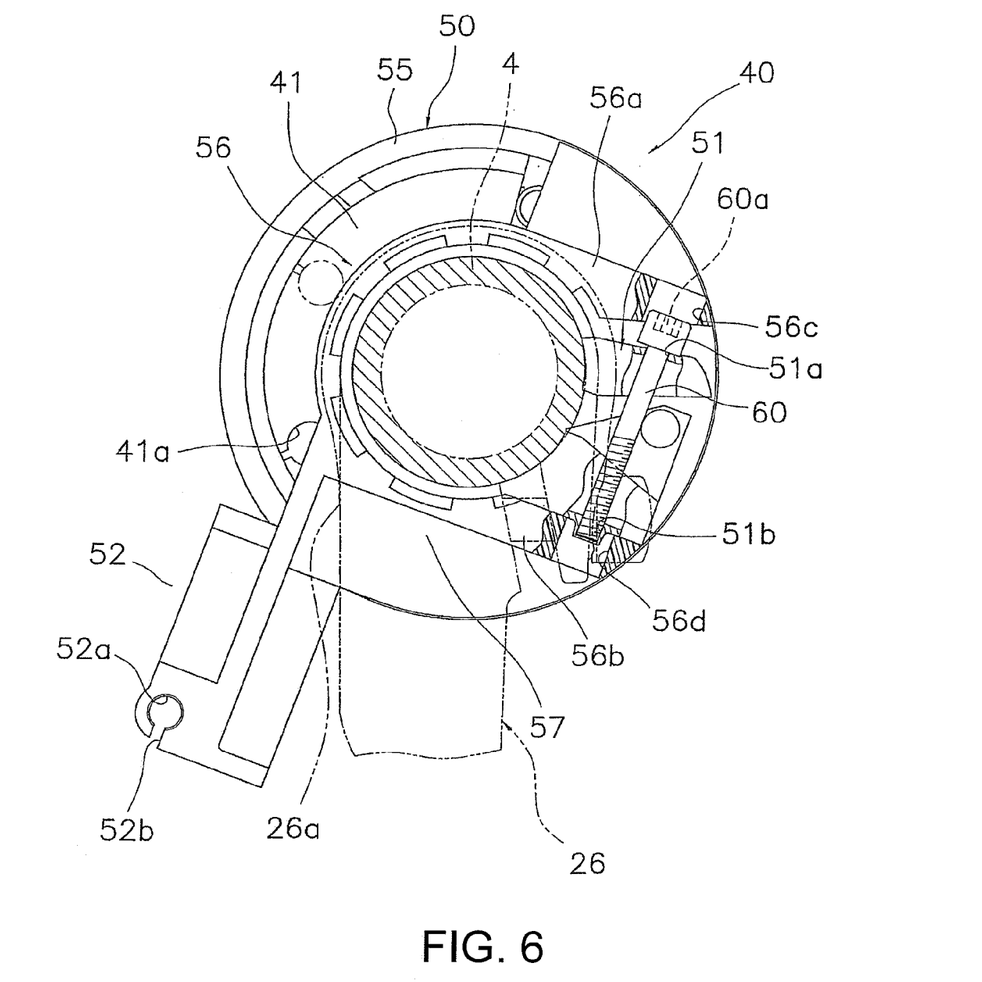
FIG. 6 is a right-hand side elevational view of the gear shifter with parts broken away for purpose of illustration.

As shown in FIG. 6, the clamp member 51 is U-shaped and configured such that it can clamp onto the handlebar 4. The clamp member 51 has a through hole 51a and a nut part 51b. The through hole 51a is configured to stop the head 60a of the clamp bolt 60 provided in one end. The nut part 51b is configured to mesh with the clamp bolt 60 provided on the other end.

The wire guiding structure 52 first extends from the mounting part main body 50 in a first direction that intersects with the handlebar 4 and then bends to a second direction that is parallel (or within ten degrees of parallel) to the handlebar 4. The inner wire connector 45 is movably arranged along the wire guiding structure 52 and configured to detachably hold an end of an inner wire 30a of the gear shift cable 30. The distal end of the portion of the wire guiding structure 52 that is substantially parallel (or substantially parallel, i.e., within ten degrees of parallel) to the handlebar 4 is provided with an outer casing stop 59 capable of holding an outer casing 30b of the gear shift cable 30. Thus, the tip end of the gear shift cable 30 is arranged to be substantially parallel to the handlebar 4, and consequently, the gear shift cable 30 does not readily interfere with a front basket 6 if the front basket 6 is mounted to the front of the frame 2.

The distal end of the wire guiding structure 52 is provided with a threaded hole 52a into which the outer casing stop 59 is installed to enable the tension of the inner wire 30a to be adjusted and a cable slit 52b arranged and configured to enable the inner wire 30a to be put in place from the side. The outer casing stop 59 is prevented from rotating with a lock nut 59a. One surface of the wire guiding structure 52 is formed to have a wire movement space 52c configured to enable the inner wire 30a and the connecting cable 44 to move. A positioning protrusion 52d is provided on an inner wall surface of the wire movement space 52c.

Figure 4:
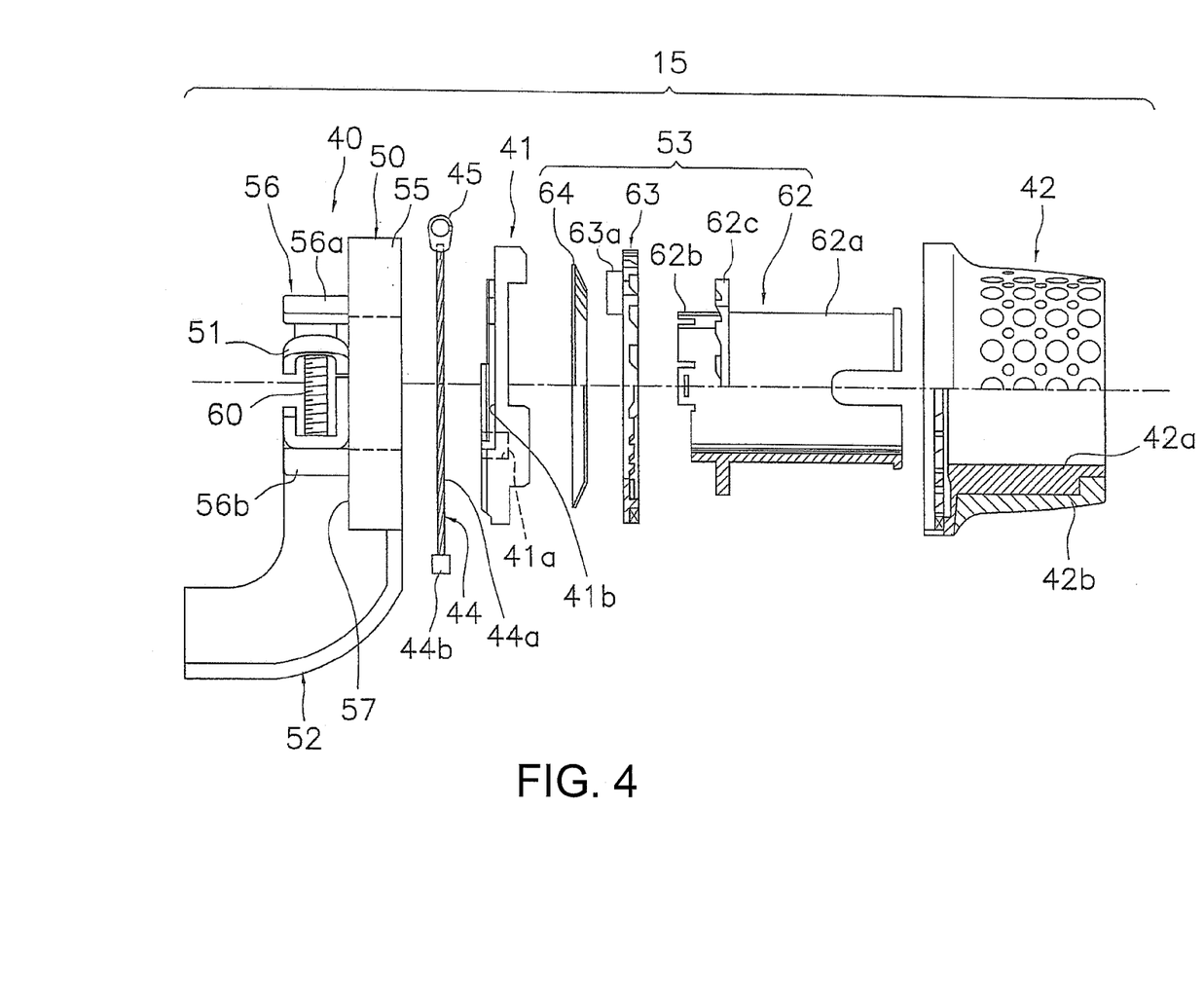
FIG. 4 is an exploded rear view of the gear shifter showing the main components of the gear shifter.

As shown in FIG. 4, the turning movement support section 53 is configured to rotatably support the winding member 41 and the operating member 42 and to position the operating member 42 and the winding member 41 at three indexing positions. The turning movement support section 53 includes a cylindrical support body 62, an intermediate member 63 and a force applying member 64. The cylindrical support body 62 rotatably supports the winding member 41 and operating member 42. The intermediate member 63 is arranged and configured to rotate integrally with the operating member 42. The force applying member 64 (e.g., a Belleville spring) serves to load the intermediate member 63 toward the support body 62. The support body 62 has an operating member support section 62a, a winding member support section 62b and a larger-diameter flange section 62c. The operating member support section 62a supports the operating member 42. The winding member support section 62b supports the winding member 41. The larger-diameter flange section 62c is arranged between the two support sections 62a and 62b.

The intermediate member 63 is a generally circular disk shaped member called an idler. The intermediate member 63 is configured such that it can move freely in the axial direction along the winding member support section 62b. The intermediate member 63 is also configured such that the outer circumference thereof engages with the operating member 42. Thus, the intermediate 63 rotates integrally with the operating member 42. A radially inner portion of the intermediate member 63 engages with the flange section 62c such that it is positioned in one of three positions along the rotational direction. The intermediate member 63 has an engagement protrusion 63a configured to engage with the winding member 41 in such a manner as to transfer turning (rotary) movement to the winding member 41.

The winding member 41 can turn about the axis of the handlebar 4. The winding member 41 is rotatably supported on the winding member support section 62b of the support body 62 of the mounting part 40. A cable holding section 41a configured to engage with and hold one end of the connecting cable 44 is provided in a radially outer portion of the winding member 41. A cable winding groove 41b configured for the connecting cable 44 to wind onto is provided on a radially outward facing surface of the winding member 41.

The operating member 42 is a generally cylindrical member having a turning part 42a and an operating grip part 42b. The turning part 42a is made of a synthetic resin material and supported in a freely rotatable manner on the operating member support section 62a. The operating grip part 42b is made of a synthetic rubber material and mounted on the external circumference of the turning part 42a in such a manner that it can rotate integrally with the turning part 42a. As shown in FIG. 2, a handlebar grip 70 is installed on the end portion of the handlebar 4 adjacent to the operating grip part 42b.

Figure 5:
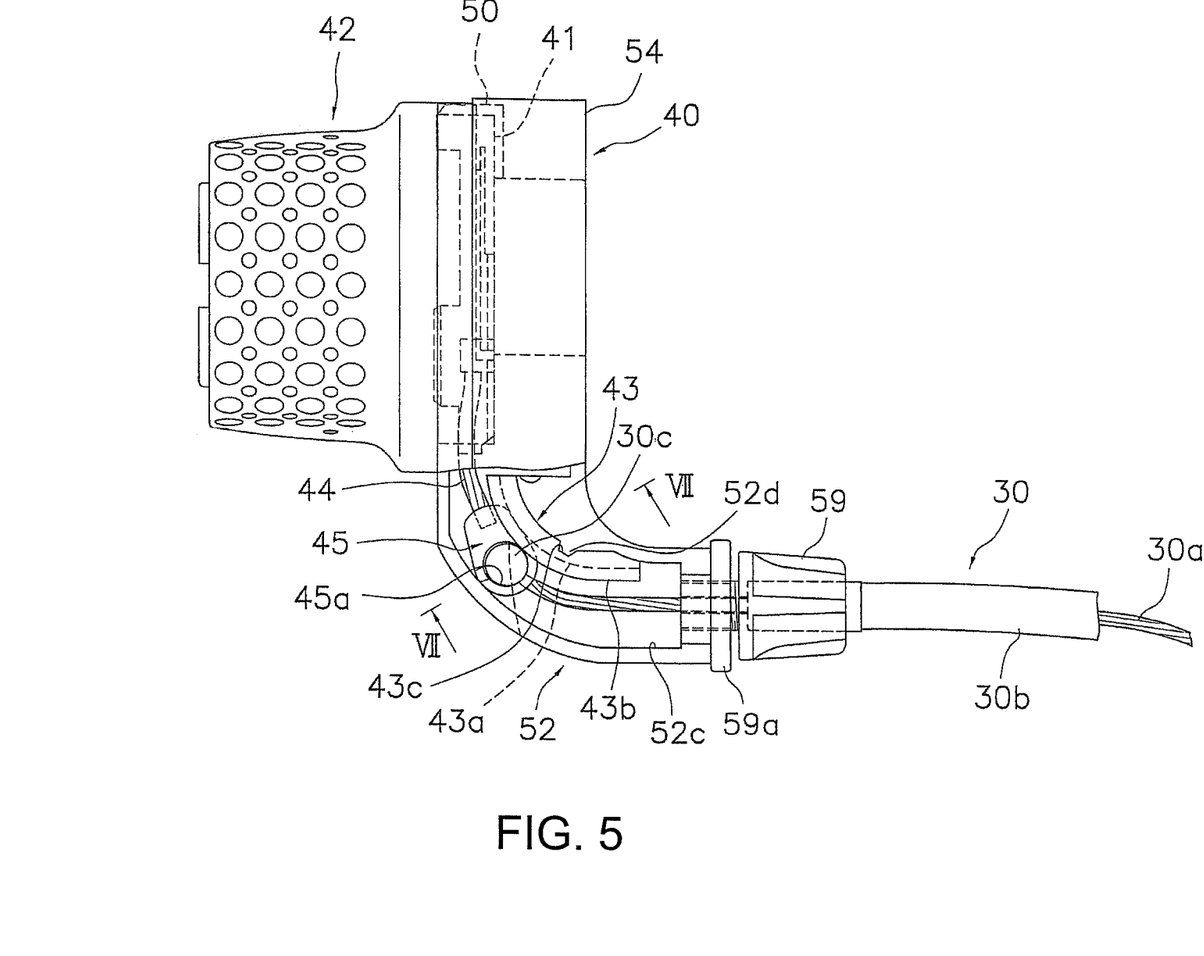
FIG. 5 is an enlarged front view of the wire guiding structure of the gear shifter.
Figure 7:
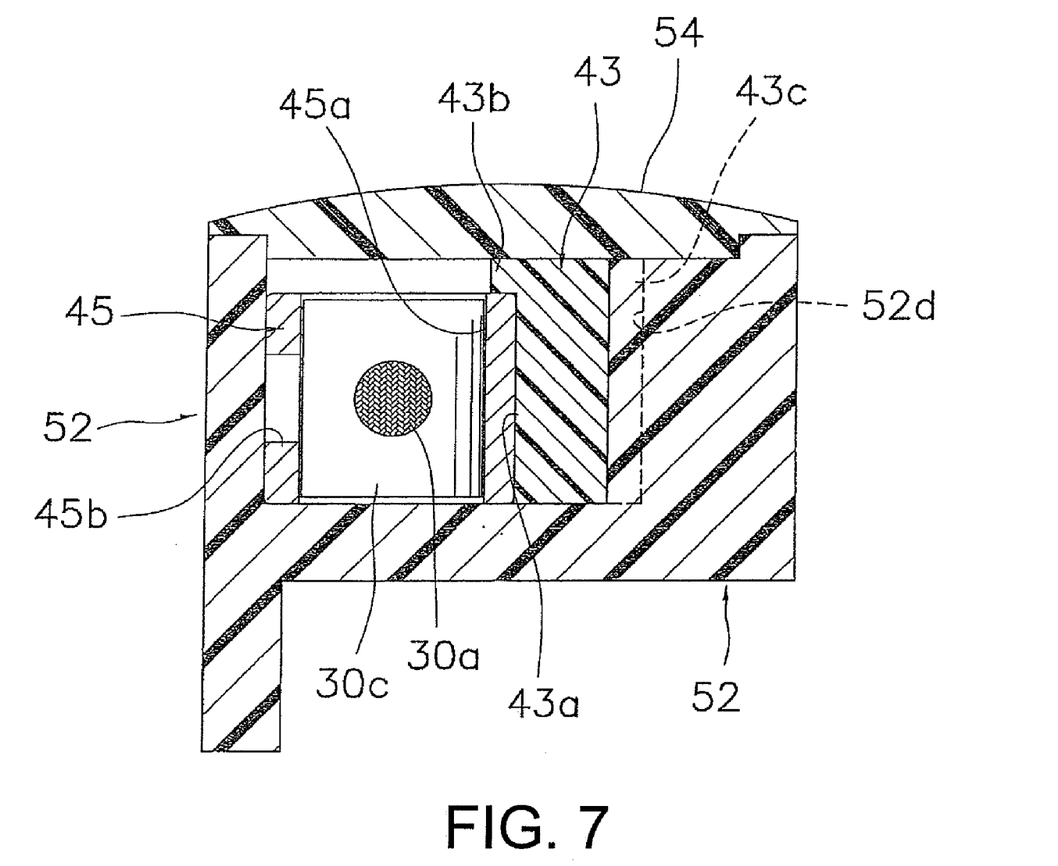
FIG. 7 is a cross sectional view of the gear shifter taken along the section line VII-VII of FIG. 5.

As shown in FIGS. 5 and 7, the connector guide part 43 is removably installed inside the wire movement space 52c of the wire guiding structure 52 of the mounting part 40. The connector guide part 43 is made of a synthetic resin material having a comparatively small sliding resistance, e.g., a polyacetal resin or a fluorine resin. The connector guide part 43 has a curved surface 43a, a separation preventing section 43b and a positioning recess 43c. The curved surface 43a is arranged in the curved portion of the wire guiding structure 52. The separation preventing section 43b protrudes beyond the rest of the connector guide part 43 and serves to prevent the inner wire connector 45 from becoming misaligned with respect to the connector guide part 43. The positioning recess 43c configured to position the connector guide part 43 by engaging with the positioning protrusion 52d provided on an inner wall surface of the wire movement space 52c of the wire guiding structure 52.

As shown in FIG. 4, the connecting cable 44 has a cable section 44a having the same specifications as the inner wire 30a and a circular rod-shaped nipple 44b that is welded onto the first end of the cable section 44a and configured to engage detachably with the cable holding section 41a of the winding member 41. The length of the cable section 44a is such that the inner wire connector 45 connected to the second end of the connecting cable 44 can be arranged on the connector guide part 43 regardless of which of the three positions the winding member 41 is turned to.

As shown in FIGS. 5 and 7, the inner wire connector 45 is made of a metal material, e.g., a zinc, aluminum, or iron-based alloy. The proximal end of the inner wire connector 45 is fixed to the connecting cable 44. More specifically, the second end of the connecting cable 44 is inserted into the mold (die) used to form the inner wire connector 45 and, thus, is fixed to the proximal end of the inner wire connector 45 when the inner wire connector 45 is formed. The inner wire connector 45 is provided with an inner wire holding section 45a configured to engage with and hold the circular rod-shaped nipple 30c that is fixed to the end of the inner wire 30c. A slit 45b configured such that the inner wire 30a can pass there-through is provided in a side face of the inner wire connector 45. The slit 45b runs from a side portion to the distal end of the inner wire connector 45 and communicates with the inner wire holding section 45a.

With this gear shifter 15, when the operating member 42 is twisted (rotated) the winding member 41 turns in either the direction of winding in the inner wire 30a of the gear shift cable 30 or the direction of reeling out the inner wire 30a, thereby shifting gears. More specifically, when the operating member is turned in the wind-in direction (clockwise in FIG. 6), the turning motion is transferred from the operating member 42 to the winding member 41 through the intermediate member 63 and the winding member 41 moves from the low speed position to the medium speed position or the high speed position. When the winding member 41 turns, the connecting cable 44 is wound onto the winding member 41 and the inner wire connector 45 fixed to the second end of the connecting cable 44 is moved along the connector guide part 43 inside the wire guiding structure 52 in the direction corresponding to the upward direction in FIG. 5. Thus, the inner wire 30a, which is held by the inner wire connector 45, is pulled such that it moves in the direction corresponding to the leftward direction of FIG. 5. As a result, the internally-geared hub 18 connected to the inner wire 30a is shifted to the medium speed or high speed gear. Since the inner wire connector 45 is guided by the connector guide part 43, the frictional resistance to movement is smaller and the gear shifter can be operated smoothly even if the movement direction of the inner wire connector 45 is changed. Consequently, the limitations on the mounting direction of the gear shift cable are alleviated. When the operating member 42 is turned from the high speed position or the medium speed position toward the low speed position, the inner wire 30a pulled by the internally-geared hub 18 such that it moves the inner wire connector 45 and connecting cable 44 in the direction corresponding to the rightward direction in FIG. 5, thus causing the tension of the inner wire 30a to be relieved.

Since a connecting cable 44 is provided between the winding member 41 and the inner wire 30a and the inner wire connector 45 that holds the inner wire 30a is guided by the connector guide part 43, the length of the inner wire 30a is less limited and the mounting direction of the gear shift cable is less limited. As a result, there are fewer constrictions on the shape and structure of the gear shifter 15 and the degree of design freedom of the gear shifter 15 is improved.

When the gear shifter 15 and the brake operating device 16 are arranged adjacent to each other on the handlebar 4, first the bracket 20 of the brake operating device 16 is fitted onto an end portion of the handlebar 4 from and slipped inward toward the frame. The bracket 20 is then lightly tightened onto the handlebar 4. Next, the clamp bolt 60 of the mounting part 40 of the gear shifter 15 is turned so as to lightly tighten the mounting part 40 to the handlebar 4. At this stage, the mounting part 40 is mounted to the handlebar 4 such that the step-like section 26a of the bracket 20 of the brake operating device 16 is housed inside the housing section 57. The grip 70 is then attached to the handlebar 4 and the gear shifter 15 is secured to the handlebar 4 so as to be aligned with the grip 70. Finally, the brake operating device 16 is secured to the handlebar 4 in such an orientation that the step-like section 26a is housed inside the housing section 57. Since a portion of the bracket 20 (i.e., the step-like section 26a) is housed inside the housing section 57 of the mounting part 40, the distal end of the brake lever 21 mounted pivotally to the bracket 20 is arranged as far as possible in the axially outward direction of the handlebar 4. As a result, the operable length of the brake lever 21 is prevented from decreasing to the greatest degree possible.

Other Embodiments

Although the previously described embodiment illustrates a case in which the present invention is applied to a twist-grip type gear shifter serving to shift an internally-geared hub 18, the present invention is not limited to such an application and can be applied any gear shifter configured to be mounted to a handlebar, regardless of the type of gear changing device or the number of gears to be shifted among. For example, the present invention can be applied to either a twist-grip type or a lever type gear shifter that is used to operate either an internally installed gear changing device or an externally installed gear changing device, such as a derailleur.

Although the previously described embodiment illustrates a case in which the gear shifter 15 is separate from the brake operating device 16, the present invention can also be applied to a gear shifter that is configured together with a brake operating device as a single integral unit. In such a case, the unit can be configured such that gear shifting in at lease one direction can be accomplished with the brake lever or such that the gear shifter is operated using an operating member(s) that is separate from the brake lever.

Although the previously described embodiment illustrates a case in which a nipple 44b is fixed to the first end of the connecting cable 44 and the connecting cable 44 is detachably engaged with the winding member 41, it is also acceptable for the first end of the connecting cable 44 to be connected to the winding member 41 with some other suitable fastening means, such as welding. Also, although the previously described embodiment presents a case in which the second end of the connecting cable 44 is fixed to the inner wire connector 45, it is also acceptable for the second end of the connecting cable 44 to be connected to the inner wire connector 45 with some other means, such as by fixing a nipple to the second end (similarly to the first end) and arranging for the nipple to engage detachably with the inner wire connector 45. In short, any connecting means is acceptable so long as the first end of the connecting cable 44 is connected to the winding member 41 and the second end is connected to the inner wire connector 45.

Although in the previously described embodiment the outer casing stop 59 is a separate member configured to enable the tension of the inner wire 30a to be adjusted, it is not mandatory to provide an adjusting function and any structure is acceptable so long as the outer casing 30b can be held in place. For example, it is acceptable provide an outer casing stop on the tip end of the wire guiding structure 52.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle gear shifter comprising:
a mounting part including a handlebar mounting structure with a handlebar mounting axis and a wire guiding structure extending from the handlebar mounting structure with the wire guiding structure including a wire movement space extending to an outer casing stop;
a connector guide part disposed inside the wire movement space of the wire guiding structure;
a winding member movably connected to the mounting part;
an operating member operatively connected to the winding member to move the winding member relative to the mounting part;
an inner wire connector movably arranged inside the wire movement space along the connector guide part, with the inner wire connector being configured to detachably hold an end of an inner wire of a gear shift cable; and
a connecting cable including a first end connected to the winding member and a second end connected to the inner wire connector such that the inner wire connector moves in response to movement of the winding member,
the connector guide part including a guide surface with the inner wire connector slideably arranged on the guide surface.

2. The bicycle gear shifter as recited in claim 1, wherein the guide surface is configured as a curved surface.

3. The bicycle gear shifter as recited in claim 2, wherein the winding member is rotatably about the handlebar mounting axis as defined by the handlebar mounting structure; and
the wire guiding structure has a first section extending from the handlebar mounting structure with a center axis of the first section extends in a direction that intersects with the handlebar and a second section located remotely from the handlebar mounting structure with respect to the first section with a center axis of the second section extending in a direction that is substantially parallel with respect to the handlebar mounting axis.

4. The bicycle gear shifter as recited in claim 3, wherein the inner wire connector is fixed to the second end of the connecting cable in a non-reattachable connection.

5. The bicycle gear shifter as recited in claim 1, wherein the winding member is rotatably about the handlebar mounting axis as defined by the handlebar mounting structure; and
the wire guiding structure has a first section extending from the handlebar mounting structure with a center axis of the first section extending in a direction that intersects with the handlebar and a second section located remotely from the handlebar mounting structure with respect to the first section with a center axis of the second section extending in a direction that is substantially parallel with respect to the handlebar mounting axis.

6. The bicycle gear shifter as recited in claim 1, wherein the winding member is rotatably about the handlebar mounting axis as defined by the handlebar mounting structure.

7. The bicycle gear shifter as recited in claim 1, wherein the inner wire connector remains in contact with the guide surface of the connector guide part throughout a shifting operation.

8. The bicycle gear shifter as recited in claim 1, wherein the connector guide part and the inner wire connector cooperate together to prevent the gear shift cable from contacting walls of the wire guiding structure which partially define the wire movement space.

9. The bicycle gear shifter as recited in claim 1, wherein the connector guide part includes a groove which prevents the inner wire connector from becoming misaligned with respect to the connector guide part.

10. The bicycle gear shifter as recited in claim 1, wherein the connector guide part includes a groove within which the inner wire connector moves throughout a shifting operation.

11. A bicycle gear shifter comprising:

a mounting part including a handlebar mounting structure with a handlebar mounting axis and a wire guiding structure extending from the handlebar mounting structure with the wire guiding structure including a wire movement space extending to an outer casing stop;

a connector guide part disposed inside the wire movement space of the wire guiding structure;

a winding member movably connected to the mounting part;

an operating member operatively connected to the winding member to move the winding member relative to the mounting part;

an inner wire connector movably arranged inside the wire movement space along the connector guide part, with the inner wire connector being configured to detachably hold an end of an inner wire of a gear shift cable; and a connecting cable including a first end connected to the winding member and a second end connected to the inner wire connector such that the inner wire connector moves in response to movement of the winding member, the inner wire connector being fixed to the second end of the connecting cable in a non-reattachable connection.

12. The bicycle gear shifter as recited in claim 11, wherein the connector guide part includes a curved surface with the inner wire connector slideably arranged on the curved surface.

13. The bicycle gear shifter as recited in claim 12, wherein the winding member is rotatably about the handlebar mounting axis as defined by the handlebar mounting structure; and the wire guiding structure has a first section extending from the handlebar mounting structure with a center axis of the first section extends in a direction that intersects with the handlebar and a second section located remotely from the handlebar mounting structure with respect to the first section with a center axis of the second section extending in a direction that is substantially parallel with respect to the handlebar mounting axis.

14. The bicycle gear shifter as recited in claim 11, wherein the inner wire connector remains in contact with the guide surface of the connector guide part throughout a shifting operation.

15. The bicycle gear shifter as recited in claim 11, wherein the connector guide part and the inner wire connector cooperate together to prevent the gear shift cable from contacting walls of the wire guiding structure which partially define the wire movement space.

16. The bicycle gear shifter as recited in claim 11, wherein the connector guide part includes a groove which prevents the inner wire connector from becoming misaligned with respect to the connector guide part.

17. The bicycle gear shifter as recited in claim 11, wherein the connector guide part includes a groove within which the inner wire connector moves throughout a shifting operation.

* * * * *